United States Patent
Lim et al.

(10) Patent No.: US 11,407,321 B2
(45) Date of Patent: Aug. 9, 2022

(54) BATTERY SYSTEM FOR VEHICLE AND METHOD OF OPERATING SAME

(71) Applicant: HYUNDAI AUTOEVER CORP., Seoul (KR)

(72) Inventors: Dong Hwi Lim, Yongin-si (KR); Rae Ho Kwak, Seoul (KR); In Jung Won, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 14 days.

(21) Appl. No.: 17/115,480

(22) Filed: Dec. 8, 2020

(65) Prior Publication Data

US 2021/0197680 A1 Jul. 1, 2021

(30) Foreign Application Priority Data

Dec. 27, 2019 (KR) .......................... 10-2019-0176514

(51) Int. Cl.
*B60L 53/14* (2019.01)
*B60L 53/22* (2019.01)
(Continued)

(52) U.S. Cl.
CPC ............... *B60L 53/14* (2019.02); *B60L 53/22* (2019.02); *B60L 58/10* (2019.02);
(Continued)

(58) Field of Classification Search
CPC .......... B60L 53/14; B60L 53/22; B60L 58/10; B60L 2210/14; B60L 2210/30; B60L 2210/40; B60L 58/12; B60L 2240/427; B60L 2240/527; B60L 2240/547; B60L 53/12; B60L 53/24; B60L 50/51; B60L 50/60; H02M 1/4208; H02M 3/33561; H02M 3/01; H02M 3/28; H02M 1/007; H02M 3/1586; H02M 7/53871; H02M 3/1552; H02M 1/0095; H02M 1/15; H02M 3/04; Y02T 10/64; Y02T 10/70;
(Continued)

(56) References Cited

U.S. PATENT DOCUMENTS 9,931,951 B2    4/2018 Khaligh et al.
2013/0147431 A1*  6/2013 Lim ........................ H02M 7/68
                                                                320/109
(Continued)

FOREIGN PATENT DOCUMENTS

KR      10-1509709 B1    4/2015
KR   10-2016-0147575 A   12/2016
(Continued)

*Primary Examiner* — Paul Dinh
(74) *Attorney, Agent, or Firm* — Morgan, Lewis & Bockius LLP (57) ABSTRACT

A battery system for a vehicle may include: a charging apparatus configured to receive an alternating current power from the outside thereof in a wired/wireless manner; an on-board charger (OBC) configured to convert the alternating current power of the charging apparatus into a direct current power; a micro-control unit (MCU) configured to boost an output voltage of the OBC by use of a boost converter configured by a motor and an inverter; and a battery connected to the MCU and configured to be charged with the boosted output voltage.

13 Claims, 5 Drawing Sheets

(51) Int. Cl.
  *B60L 58/10* (2019.01)
  *H02M 3/335* (2006.01)
  *H02M 1/42* (2007.01)

(52) U.S. Cl.
  CPC ..... *H02M 1/4208* (2013.01); *H02M 3/33561* (2013.01); *B60L 2210/14* (2013.01); *B60L 2210/30* (2013.01); *B60L 2210/40* (2013.01)

(58) Field of Classification Search
  CPC ..... Y02T 10/7072; Y02T 10/72; Y02T 90/14; Y02T 90/12; B60Y 2200/91; B60Y 2200/92
  USPC ........................................................ 320/109
  See application file for complete search history.

(56) References Cited

U.S. PATENT DOCUMENTS

2020/0298722 A1* 9/2020 Smolenaers ............ B60L 53/53
2020/0304026 A1* 9/2020 Mu ........................ B60L 53/16

FOREIGN PATENT DOCUMENTS

| KR | 10-2019-0010786 A | 1/2019 |
| KR | 10-2019-0029869 A | 3/2019 |
| KR | 10-2019-0110790 A | 10/2019 |

* cited by examiner

| MODE | SW1 | SW2 |
|---|---|---|
| BATTERY CHARGING MODE | ON | ON |
| MOTOR DRIVING MODE | OFF | OFF |

FIG. 8

BATTERY SYSTEM FOR VEHICLE AND METHOD OF OPERATING SAME

CROSS-REFERENCE TO RELATED APPLICATIONS

The present application claims priority to Korean Patent Application No. 10-2019-0176514 filed on Dec. 27, 2019, the entire contents of which is incorporated herein for all purposes by this reference.

BACKGROUND OF THE INVENTION

Field of the Invention

The present invention relates to a battery system for a vehicle and a method of operating the same.

Description of Related Art

An electric vehicle and a plug-in hybrid vehicle are mostly provided with an on-board charger (OBC) to charge a battery anywhere there is a household power plug. The OBC converts an alternating current (AC), which is outputted from a commercially available power source, into a direct current (DC) to charge a battery in a vehicle. The OBC requires a high-voltage switch, an inductor, a capacitor, an insulated transformer, a relay, a control board, a cooling system, and separate packaging for configuring these components. Furthermore, each of the components, which form the charger mounted in the vehicle, is configured as an expensive and heavy component, which causes an increase in overall costs of the environment-friendly vehicle and adversely affects fuel economy of the vehicle due to an increase in weight of the vehicle.

The information included in this Background of the present invention section is only for enhancement of understanding of the general background of the present invention and may not be taken as an acknowledgement or any form of suggestion that this information forms the prior art already known to a person skilled in the art.

[Document of Related Art]
[Patent Document]
(Patent Document 1) U.S. Pat. No. 9,931,951 (Date of Patent: Apr. 3, 2018, Title: INTEGRATED DUAL-OUTPUT GRID-TO-VEHICLE G2V AND VEHICLE-TO-GRID V2G ONBOARD CHARGER FOR PLUG-IN ELECTRIC VEHICLES).

BRIEF SUMMARY

Various aspects of the present invention are directed to providing a battery system for a vehicle, which may be efficiently and inexpensively implemented, and a method of operating the same.

Various aspects of the present invention are directed to providing a battery system for a vehicle, the battery system including: a charging apparatus configured to receive an alternating current power from the outside thereof in a wired/wireless manner; an on-board charger (OBC) configured to convert the alternating current power of the charging apparatus into a direct current power; a micro-control unit (MCU) configured to boost an output voltage of the OBC by use of a boost converter configured by a motor and an inverter; and a battery connected to the MCU and configured to be charged with the boosted output voltage.

In the exemplary embodiment of the present invention, the charging apparatus may be a charging stand.

In the exemplary embodiment of the present invention, the OBC may include: a power factor correction (PFC) converter configured to change a power factor of the received alternating current power and to output a direct current voltage; a DC-DC converter configured to convert a voltage level of an output voltage of the PFC converter; and an OBC controller configured to control the PFC converter and the DC-DC converter.

In the exemplary embodiment of the present invention, a neutral line of the motor may be extracted.

In the exemplary embodiment of the present invention, the MCU may apply a 3-phase interleaved control technique to control the motor and the inverter to configure the boost converter.

In the exemplary embodiment of the present invention, the boost converter may be configured by adding at least one switch and at least one inductor to the motor and the inverter.

In the exemplary embodiment of the present invention, at least one switch may be turned off in a driving mode, and the motor may be operated by a switching operation of the inverter connected to the battery.

Various aspects of the present invention are directed to providing a method of operating a battery system for a vehicle, the method including: charging a battery, in a battery charging mode, by performing a boost converter function by use of a motor and an inverter connected to the motor and the battery in a state in which a relay is turned on; and operating the motor, in a motor driving mode, by receiving a DC voltage from the battery and outputting a 3-phase AC voltage through the inverter in a state in which the relay is turned off.

In the exemplary embodiment of the present invention, the charging of the battery may include receiving the DC voltage from a charging stand in the battery charging mode, and boosting the received DC voltage by use of the boost converter.

In the exemplary embodiment of the present invention, the operating of the motor may include converting the DC voltage of the battery into an AC voltage in the motor driving mode based on a 3-phase inverter operation of the inverter.

According to the battery system for a vehicle and the method of operating the same according to the exemplary embodiment of the present invention, the DC-DC converter configured by the LLC and the boost converter is applied for AC charging, improving control reliability.

According to the battery system for a vehicle and the method of operating the same according to the exemplary embodiment of the present invention, the DC-DC converter is configured by the LLC and the boost converter, improving efficiency and controllability.

According to the battery system for a vehicle and the method of operating the same according to the exemplary embodiment of the present invention, the boost converter is replaced by the motor and the inverter such that it is possible to solve the problem with costs and sizes caused by the LLC and the boost converter in the related art.

The foregoing summary is illustrative only and is not intended to be limiting. In addition to the illustrative aspects, embodiments, and features described above, further aspects, embodiments, and features will become apparent by reference to the drawings and the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The following accompanying drawings are provided to help understand the exemplary embodiment of the present inventions, and the exemplary embodiments are provided together with the detailed description. However, technical features of the exemplary embodiment of the present inventions are not limited to the drawings, and the features illustrated in the respective drawings may be combined to form a new exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the contents of the present invention will be described in detail with reference to the drawings so that those skilled in the art may easily carry out the present invention.

The present invention may be variously modified and may have various forms, and particular exemplary embodiments illustrated in the drawings will be described in detail below. However, the description of the exemplary embodiments is not intended to limit the present invention to the particular exemplary embodiments of the present invention, but it may be understood that the present invention is to cover all modifications, equivalents and alternatives falling within the spirit and technical scope of the present invention. The terms such as "first" and "second" may be used to describe various constituent elements, but the constituent elements may not be limited by the terms.

These terms are used to distinguish one constituent element from another constituent element. For example, a first component may be named a second component, and similarly, the second component may also be named the first component, without departing from the scope of the present invention. When one constituent element is referred to as being "connected" or "coupled" to another constituent element, it may be understood that one constituent element may be connected or coupled directly to another constituent element, and an intervening constituent element can also be present between the constituent elements. When one constituent element is referred to as being "connected directly to" or "coupled directly to" another constituent element, it may be understood that no intervening constituent element is present between the constituent elements.

Other expressions, that is, "between" and "just between" or "adjacent to" and "directly adjacent to", explaining a relationship between constituent elements, may be interpreted in a similar manner. The terminology used herein is used for describing particular example embodiments only and is not intended to be limiting. Singular expressions include plural expressions unless clearly referred to as different meanings in the context.

The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Unless otherwise defined, all terms used herein, including technical or scientific terms, have the same meaning as commonly understood by those skilled in the art to which various exemplary embodiments of the present invention pertains. The terms such as those defined in a commonly used dictionary may be interpreted as having meanings consistent with meanings in the context of related technologies and may not be interpreted as ideal or excessively formal meanings unless explicitly defined in the present application.

Figure 1:
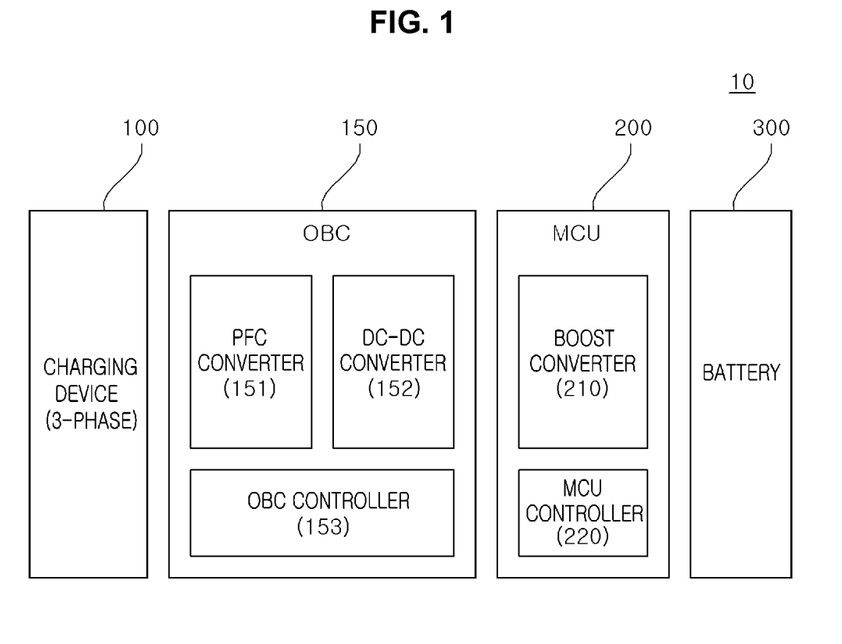
FIG. 1 is a view exemplarily illustrating a charging mode of a battery system for a vehicle according to various exemplary embodiments of the present invention.

FIG. 1 is a view exemplarily illustrating a charging mode of a battery system for a vehicle according to various exemplary embodiments of the present invention. Referring to FIG. 1, the battery system 10 for a vehicle may include a charging device 100, an on-board charger (OBC) 150, a microcontroller unit (MCU) 200, and a battery 300.

The charging device 100 may be implemented to receive external alternating current power in a wired/wireless manner. In the exemplary embodiment of the present invention, the charging device 100 may be a charging stand. In the exemplary embodiment of the present invention, the alternating current power may be single-phase alternating current power. In another exemplary embodiment of the present invention, the alternating current power may be 3-phase alternating current power.

The OBC 150 may be a charger mounted in the vehicle to generate direct current power by use of alternating current power received through the charging device 100. The OBC 150 may include a power factor correction (PFC) converter 151, a DC-DC converter 152, and an OBC controller 153.

The PFC converter 151 may convert the input alternating current power into the direct current power, improving a power factor. That is, the PFC converter 151 may suppress or remove a high-frequency current component. For example, the PFC converter 151 may control an input/output voltage by controlling a duty ratio of a switching module.

The DC-DC converter 152 may convert a voltage level of the output direct current voltage of the PFC converter 151. The DC-DC converter 152 may use frequency switching control of the DC-DC converter 152 to boost or lower the voltage outputted from the PFC converter 151. In the instant case, the frequency switching control of the DC-DC converter 152 may be used to control a ripple current of an output terminal of the DC-DC converter 152.

The OBC controller 153 may control the PFC converter 151 and the DC-DC converter 152.

The MCU (i.e., a controller for a vehicle) 200 may be implemented to boost the output voltage of the OBC 150 to charge the battery 300. The MCU 200 may include a boost converter 210, and an MCU controller 220 configured to control the boost converter 210.

The boost converter 210 may boost the direct current voltage outputted from the OBC 150 during an AC charging operation. In the instant case, the boost converter 210 may have topology including a motor and an inverter.

The battery 300 may be implemented to be charged with energy having the voltage boosted by the MCU 300. In the instant case, the battery may be an 800 V high-voltage battery. Meanwhile, it may be understood that the voltage of the battery 300 is not limited thereto.

The battery system 10 for a vehicle according to the exemplary embodiment of the present invention is provided with the OBC 150 including the PFC converter 151 and the DC-DC converter 152, and the MCU (i.e., a power controller) 200 having the topology of the boost converter 210 including the motor and the inverter, and as a result, the battery system 10 may be applied to a high-voltage battery at low cost while improving conversion efficiency.

According to the battery system 10 for a vehicle according to the exemplary embodiment of the present invention, the MCU 200, which is required to perform AC charging, may be configured by use of the motor and the inverter, efficiently charging the battery 300.

According to the battery system 10 for a vehicle according to the exemplary embodiment of the present invention, the boost converter may be configured by use of the motor and the inverter in consideration of a 400 V EVSE system during high-speed DC charging, charging the battery 300 at low cost.

Figure 2:
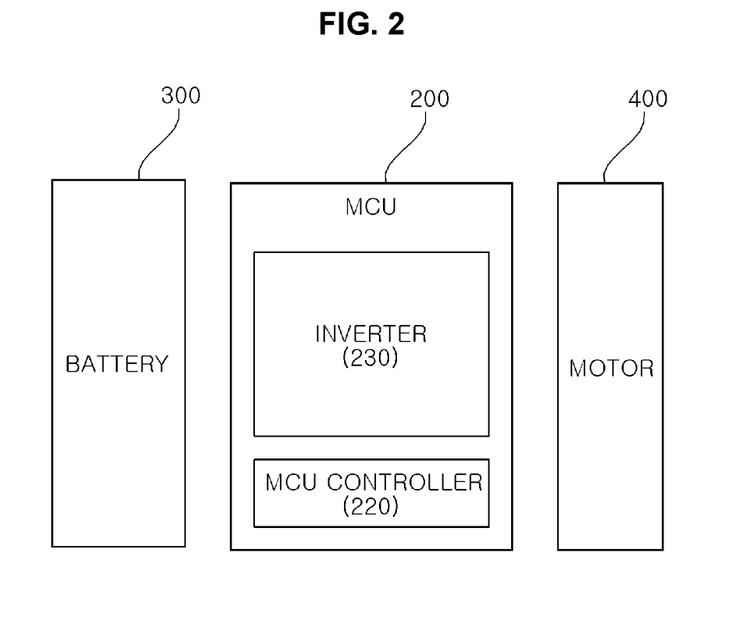
FIG. 2 is a view exemplarily illustrating a driving mode of the battery system 10 for a vehicle according to the exemplary embodiment of the present invention.

FIG. 2 is a view exemplarily illustrating a driving mode of the battery system 10 for a vehicle according to the exemplary embodiment of the present invention. Referring to FIG. 2, the MCU 200, which receives power from the battery 300, may operate a motor 400. The MCU 200 may be implemented to perform a function of a boost converter 210 (see FIG. 1) with an inverter 230 and the motor 400.

Figure 3:
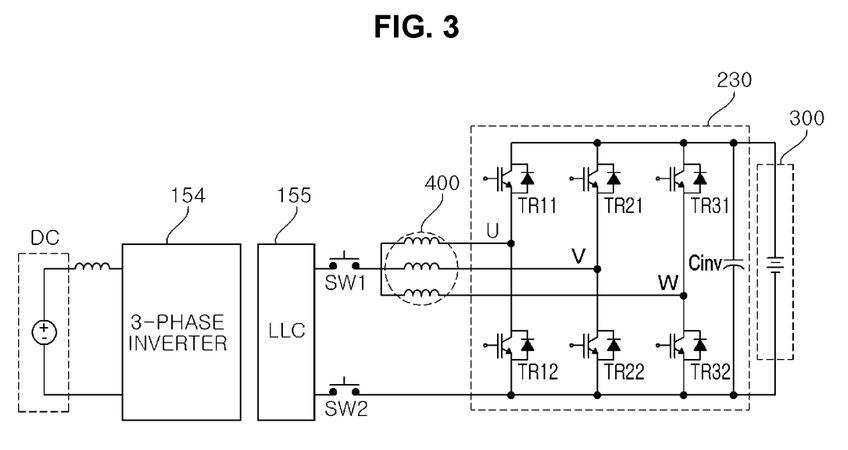
FIG. 3 is a view exemplarily illustrating topology in the charging mode of the battery system 10 for a vehicle according to the exemplary embodiment of the present invention.

FIG. 3 is a view exemplarily illustrating topology in the charging mode of the battery system 10 for a vehicle according to the exemplary embodiment of the present invention.

The inverter 230 may include a capacitor Cinv, and transistor pairs TR11-TR12, TR21-TR22, and TR31-TR32 connected to reactors corresponding to phases u, v, and w of the motor 400. The transistor pairs TR11-TR12, TR21-TR22, and TR31-TR32 may be connected to both end portions of the battery 300, respectively.

The first switch SW1 may be switched to connect inductor-inductor-capacitor (LLC) 155 and a neutral line of the motor 400. The second switch SW2 may be switched to connect the LLC 155 and a negative voltage terminal of the battery 300. In the exemplary embodiment of the present invention, the reactor may be optionally added between the LLC 155 and the neutral line of the motor 400.

In an exemplary embodiment of the present invention, a 3-phase inverter 154 is added between a power source and the LLC 155.

In the exemplary embodiment of the present invention, the motor 400 may be manufactured such that the neutral line of the motor 400 is extracted (exposed to the outside).

In the exemplary embodiment of the present invention, the boost converter may be configured by adding an additional inductor and a switch element such as a relay to the motor 400 and the inverter 230.

In the exemplary embodiment of the present invention, to configure the boost converter, a 3-phase interleaved control technique may be applied to optimally control the motor-inverter system.

Figure 4:
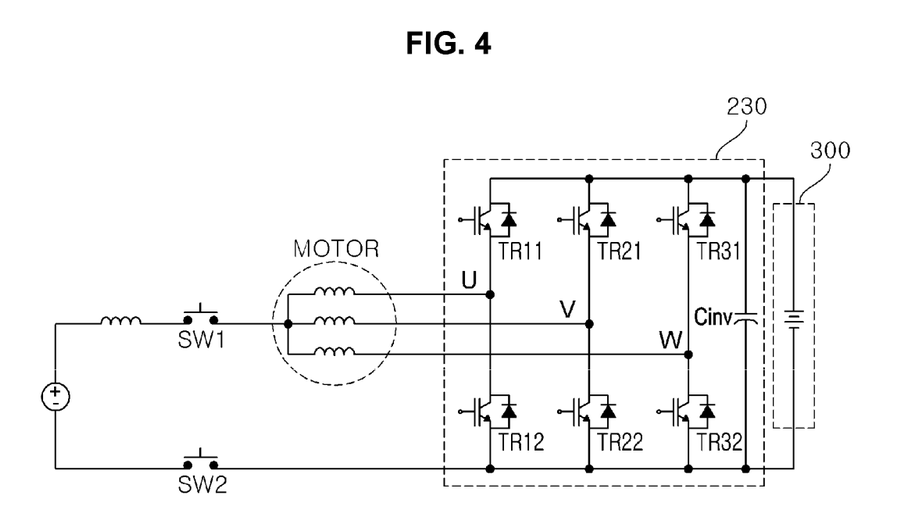
FIG. 4 is a view exemplarily illustrating topology in the driving mode of the battery system 10 for a vehicle according to the exemplary embodiment of the present invention.

FIG. 4 is a view exemplarily illustrating topology in the driving mode of the battery system 10 for a vehicle according to the exemplary embodiment of the present invention. As illustrated in FIG. 4, the motor and the inverter 230 may be used in a charging mode. Because the use of the motor and the inverter 230 varies depending on types of modes, the operations may be determined by the relays (or the switches SW1 and SW2) even in the driving mode. In the driving mode, the switches SW1 and SW2 may be turned off.

The motor 400 and the inverter 230 may operate in the same manner as the system in the related art.

Figure 5:
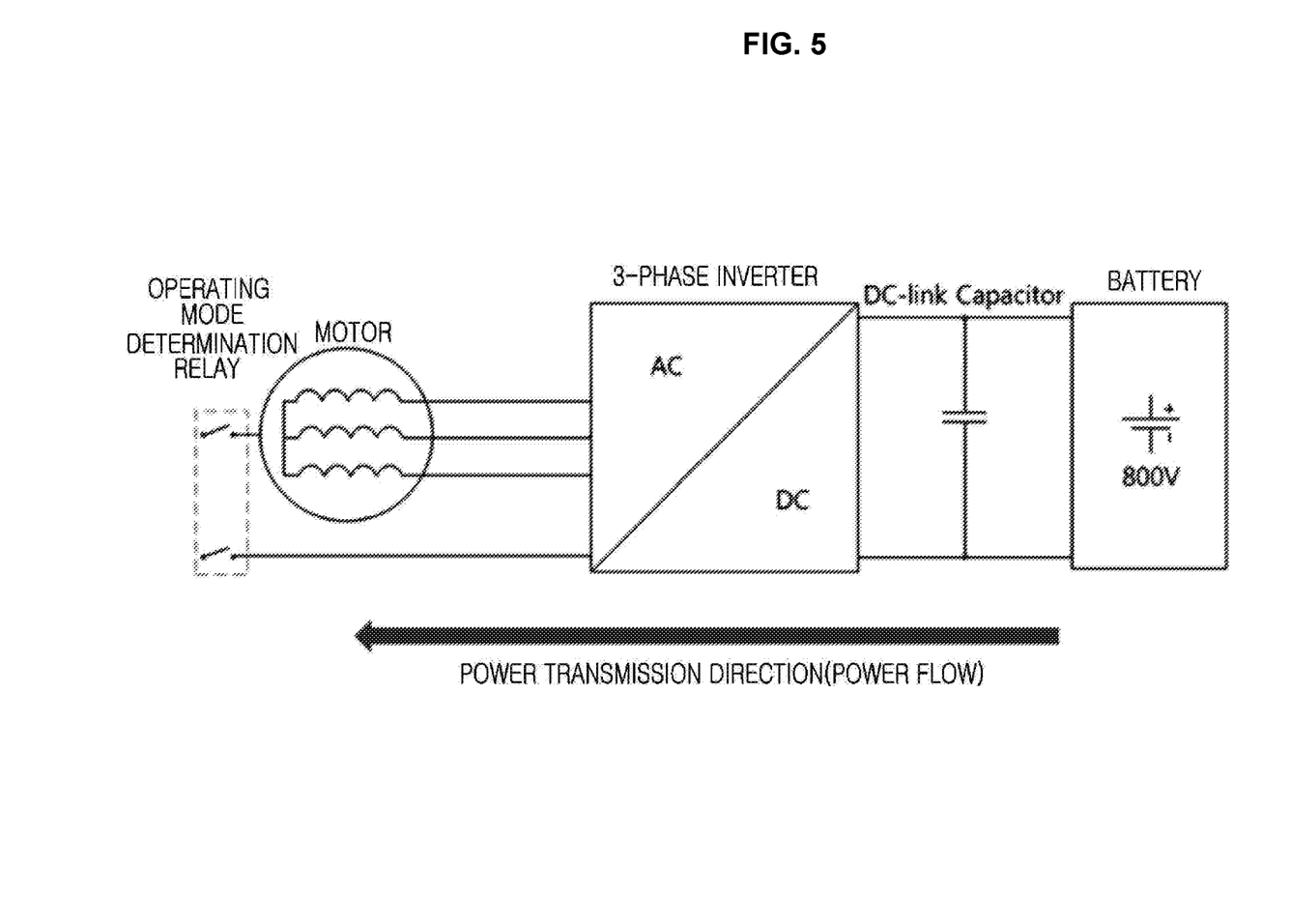
FIG. 5 is a view conceptually illustrating a circuit related to a motor driving mode of the battery system 10 for a vehicle according to the exemplary embodiment of the present invention.

FIG. 5 is a view conceptually illustrating a circuit related to a motor driving mode of the battery system 10 for a vehicle according to the exemplary embodiment of the present invention. Referring to FIG. 5, in a motor driving mode, power is transmitted from the battery 300 to a 3-phase inverter 230 through a DC link capacitor Cinv, and the motor 400 may be operated by the 3-phase inverter 230. In the exemplary embodiment of the present invention, the 3-phase inverter may operate the motor 400 by converting DC power of the battery 300 into AC power. In the exemplary embodiment of the present invention, the operating mode determination relays SW1 and SW2 may be in an off state in the motor driving mode. The power of the battery 300 may be consumed as the motor is driven.

Figure 6:
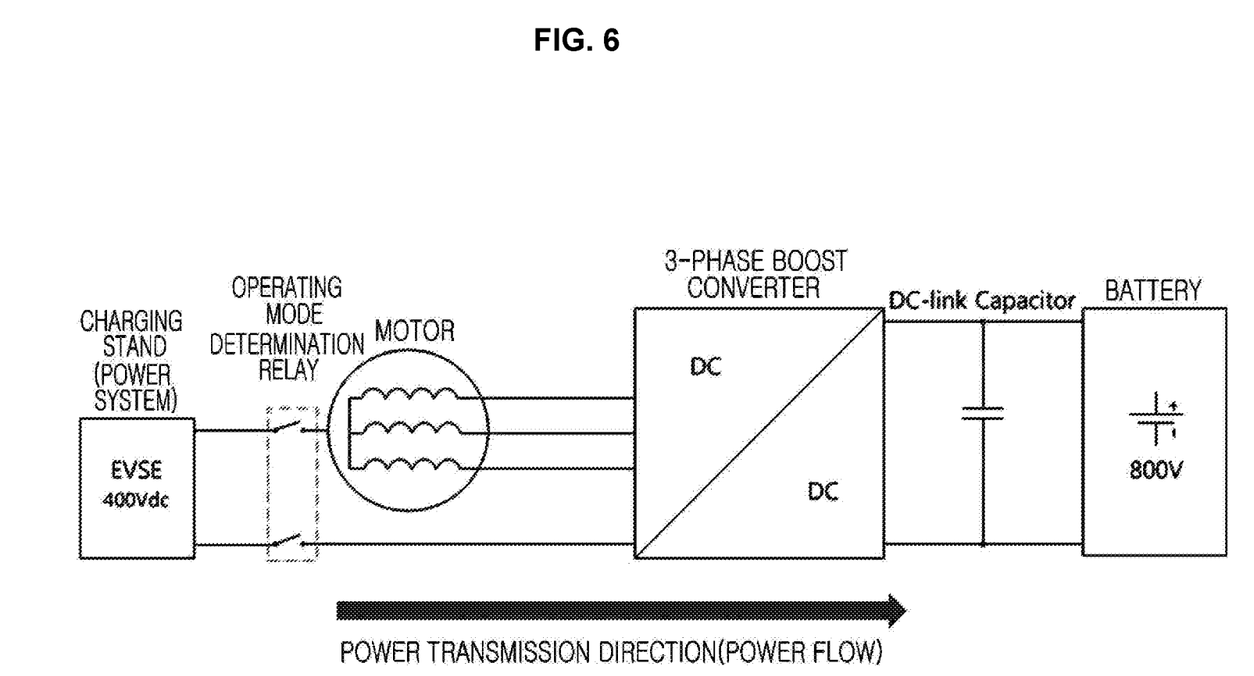
FIG. 6 is a view conceptually illustrating a circuit related to the charging mode of the battery system 10 for a vehicle according to the exemplary embodiment of the present invention.

FIG. 6 is a view conceptually illustrating a circuit related to the charging mode of the battery system 10 for a vehicle according to the exemplary embodiment of the present invention. Referring to FIG. 6, in the charging mode, the charging device 100 (EVSE, power system) outputs a single-phase AC voltage, and the operating mode determination relay may be switched depending on the determination of the charging mode.

In the exemplary embodiment of the present invention, the battery may be charged by use of the boost converter. In the instant case, the boost converter may include the motor and the 3-phase inverter.

In the exemplary embodiment of the present invention, the boost converter may be controlled by use of the motor and the inverter.

In the exemplary embodiment of the present invention, the boosted DC voltage may be transmitted to the battery 300 through the DC link capacitor Cinv.

Figure 7:
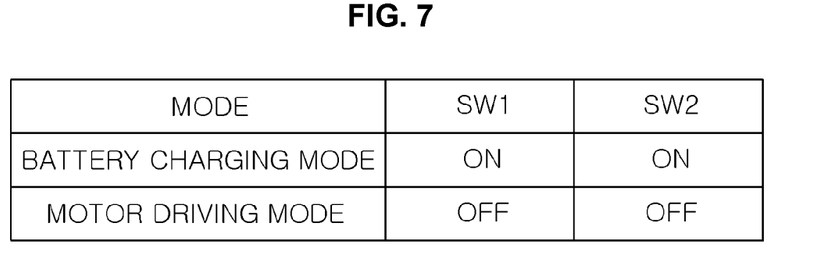
FIG. 7 is a view exemplarily illustrating an operation of a relay of the battery system 10 for a vehicle according to the exemplary embodiment of the present invention.

FIG. 7 is a view exemplarily illustrating an operation of a relay of the battery system 10 for a vehicle according to the exemplary embodiment of the present invention. Referring to FIG. 7, the first and second switches SW1 and SW2 are turned on during the charging operation, and the first and second switches SW1 and SW2 may be turned off when the motor operates.

Figure 8:
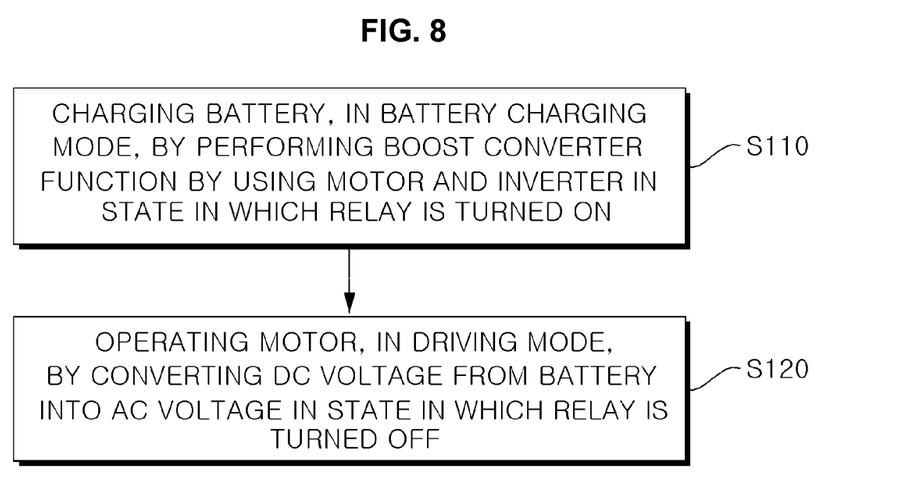
FIG. 8 is a view exemplarily illustrating a method of operating an MCU 200 according to the exemplary embodiment of the present invention.

FIG. 8 is a view exemplarily illustrating a method of operating an MCU 200 according to the exemplary embodiment of the present invention. Referring to FIG. 1, FIG. 2, FIG. 3, FIG. 4, FIG. 5, FIG. 6, FIG. 7, and FIG. 8, a method of operating the MCU 200 may be performed as follows.

In the battery charging mode, the MCU 200 may charge the battery 300 by performing the boost converter function by use of the motor 400 and the inverter 230 in the state in which the relay is turned on (S110).

In the motor driving mode, the MCU 200 may operate the motor 400 by receiving the DC voltage from the battery 300 and outputting the 3-phase AC voltage in the state in which the relay is turned off (S120).

In the exemplary embodiment of the present invention, in the battery charging mode, the charging of the battery may include receiving a DC voltage from the charging stand 100, and boosting the received DC voltage by use of the boost converter 210. In the instant case, the boost converter 210 may function by use of the inverter 230 and the motor 400.

In the exemplary embodiment of the present invention, in the motor driving mode, the operating of the motor 400 may include converting the DC voltage of the battery 300 into an AC voltage based on the 3-phase inverter operation of the inverter 230.

The steps and/or the operations according to various exemplary embodiments of the present invention may be simultaneously incurred in other exemplary embodiments in another order, in parallel, or for another epoch, which will be understood by those skilled in the art.

Depending on various exemplary embodiments of the present invention, a portion or all of the steps and/or the operations may be implemented or performed by use of one or more processors driving a command stored in one or more non-temporary computer-readable media, a program, an interactive data structure, a client, and/or a server. An example of the one or more non-temporary computer-readable media may be software, firmware, hardware, and/or any combination thereof. Furthermore, a function of "module" discussed in the exemplary embodiment may be implemented by software, firmware, hardware, and/or any combination thereof.

One or more non-temporary computer-readable media and/or means for implementing/performing one or more operations/steps/modules of the exemplary embodiments of the present invention may include Application-Specific Integrated Circuits (ASICs), standard integrated circuits, a microcontroller, a controller performing appropriate commands, an embedded controller, Field-Programmable Gate Arrays (FPGAs), Complex Programmable Logic Devices (CPLDs), and the equivalent matters thereof, but are not limited thereto.

In the meantime, the contents of the present invention are simply the particular exemplary embodiments for carrying out the present invention. The present invention may include a technical spirit which is abstract and conceptual idea utilizable as a technology in the future, as well as a particular and actually usable means itself.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A battery system for a vehicle, the battery system comprising:
   a charging apparatus configured to receive an alternating current power from the outside thereof wiredly or wirelessly;
   an on-board charger (OBC) configured to convert the alternating current power of the charging apparatus into a direct current power;
   a micro-control unit (MCU) configured to boost an output voltage of the OBC by use of a boost converter configured by a motor and an inverter; and
   a battery connected to the MCU and configured to be charged with the boosted output voltage,
   wherein the boost converter is configured by adding at least one switch to the motor and the inverter, and
   wherein the at least one switch includes a second switch configured to be switched to connect an inductor-inductor-capacitor (LLC) and a negative voltage terminal of the battery.

2. The battery system of claim 1, wherein the charging apparatus is a charging stand.

3. The battery system of claim 1, wherein the OBC includes:
   a power factor correction (PFC) converter configured to change a power factor of the received alternating current power and to output a direct current voltage;
   a DC-DC converter configured to convert a voltage level of an output voltage of the PFC converter; and
   an OBC controller configured to control the PFC converter and the DC-DC converter.

4. The battery system of claim 1, wherein a neutral line of the motor is extracted.

5. The battery system of claim 1, wherein the MCU is configured to apply a 3-phase interleaved control to control the motor and the inverter to configure the boost converter.

6. The battery system of claim 1, wherein the boost converter is further configured by adding at least one inductor to the motor and the inverter.

7. The battery system of claim 6, wherein the at least one switch is turned off in a driving mode, and the motor is operated by a switching operation of the inverter connected to the battery.

8. The battery system of claim 7, wherein the at least one switch further includes:
   a first switch configured to be switched to connect a neutral line of the motor.

9. The battery system of claim 8, wherein the first switch is configured to be switched to connect the inductor-inductor-capacitor (LLC) and the neutral line of the motor.

10. A method of operating a battery system for a vehicle, the method comprising:
   charging a battery, in a battery charging mode, by performing a boost converter function by use of a motor and an inverter connected to the motor and the battery in a state in which a relay connected to the motor and a power system is turned on, wherein the battery system includes the battery, a boost converter configured by the motor and the inverter, and the power system; and
   operating the motor, in a motor driving mode, by receiving a DC voltage from the battery and outputting a 3-phase AC voltage through the inverter in a state in which the relay is turned off,
   wherein the boost converter is configured by adding at least one switch to the motor and the inverter, and
   wherein the at least one switch includes a second switch configured to be switched to connect an inductor-inductor-capacitor (LLC) and a negative voltage terminal of the battery.

11. The method of claim 10,
wherein the power system is a charging stand, and
wherein the charging of the battery includes:
   receiving the DC voltage from the charging stand connected to the relay in the battery charging mode; and
   boosting the received DC voltage by use of the boost converter.

12. The method of claim 10,
wherein the inverter is a 3-phase inverter, and
wherein the operating of the motor includes converting the DC voltage of the battery into an AC voltage in the motor driving mode according to an operation of the 3-phase inverter.

13. The method of claim 10,
wherein a controller is configured to control the relay, the motor and the inverter, and
wherein the controller includes:
   a processor; and
   a non-transitory storage medium on which a program for performing the method of claim 10 is recorded and executed by the processor.

* * * * *